United States Patent
Merklein et al.

[11] Patent Number: 6,045,267
[45] Date of Patent: Apr. 4, 2000

[54] MOUNTING FOR ROTATIONAL SPEED SENSOR FOR WHEEL BEARING FOR AUTOMOBILES

[75] Inventors: Harald Merklein, Schweinfurt; Peter Niebling, Bad Kissingen; Rainer Breitenbach, Gochsheim; Heinrich Hofmann, Schweinfurt; Roland Langer, Schwanfeld, all of Germany

[73] Assignee: FAG Automobiltechnik AG, Germany

[21] Appl. No.: 09/136,550

[22] Filed: Aug. 19, 1998

[30] Foreign Application Priority Data

Aug. 19, 1997 [DE] Germany ............................ 197 35 978

[51] Int. Cl.⁷ ..................................................... F16C 19/18
[52] U.S. Cl. ............................................................. 384/448
[58] Field of Search .................................. 384/448, 446, 384/544, 537, 589

[56] References Cited

U.S. PATENT DOCUMENTS 5,564,839 10/1996 Ouchi et al. .
5,762,425 6/1998 Ouchi .................................. 384/448

*Primary Examiner*—Lenard A. Footland
*Attorney, Agent, or Firm*—Ostrolenk, Faber, Gerb & Soffen, LLP

[57] ABSTRACT

A wheel bearing with a pulse transmitter attached to the inner bearing ring and a wheel carrier attached to the outer bearing ring. A pot shaped cap over the lateral end of the bearing. A depression in the wheel carrier opens toward the pulse transmitter. A sensor located in the recess has an end face that is urged by a spring in the depression against the cap over the pulse transmitter for establishing a selected spacing between the pulse transmitter and the sensor.

14 Claims, 2 Drawing Sheets

6,045,267

MOUNTING FOR ROTATIONAL SPEED SENSOR FOR WHEEL BEARING FOR AUTOMOBILES

BACKGROUND OF THE INVENTION

The present invention relates to a bearing for sensing rotational speed of a wheel, particularly of an automotive vehicle, and more particularly relates to the mounting and support of the rotation sensor.

Various wheel bearings with rotational speed measuring devices have been disclosed. In an already relatively simple arrangement, the sensors are mounted in the housing or wheel carrier and are located opposite a pulse transmitter that is mounted on the wheel bearing so that there is relative rotation between the pulse transmitter and the sensor.

German Offenlegungsschrift 44 31 746 discloses, for example, the sensor mounted in a housing component using a threaded section. This requires additional measures on a plurality of components. In addition, the required gap between the sensor and the pulse transmitter, which must be complied with very precisely, can be set only through additional expenditure.

SUMMARY OF THE INVENTION

It is an object of the present invention to present a bearing with rotational speed sensing which does not have the above disadvantages and, with very simple means without high levels of precision being demanded of the individual components, permits secure mounting and accurate positioning of the sensor.

The invention concerns a wheel bearing with a pulse transmitter attached to the inner bearing ring and a wheel carrier attached to the outer bearing ring. A pot shaped cap is over the lateral end of the bearing. A depression in the wheel carrier opens toward the pulse transmitter. A sensor located in the recess has an end face that is urged by a spring in the depression against the cap over the pulse transmitter for establishing a selected spacing between the pulse transmitter and the sensor.

This embodiment provides a self aligning sensor mount which is easy to arrange. It requires only an easy to produce depression in the wheel carrier, which does not require particularly high levels of precision. The sensor is inserted into the depression, along with a spring behind the sensor, during assembly. Precise alignment of the sensor is not necessary because the spring presses the sensor automatically into the correct position, specifically because the sensor under the spring pressure comes to bear against a face on the bearing which has already been manufactured with precision for other reasons.

Since bearing sealing means are often necessary, it is expedient to use the base of a pot-shaped cover cap as the bearing face for the sensor. The position of this cover cap is defined in a precise fashion during assembly, and its base is preferably arranged in a plane which is determined by a precisely fabricated bearing face.

To simplify assembly of a sensor which is provided with electric cables, a small drilled hole is made in the base of the depression through which the cables are guided. Assembly using a slit in the wheel carrier is even simpler. Then, simple radial insertion of the sensor with the cable from the inside is possible. A projection mounted on the sensor can protrude into this slit. This key arrangement prevents undesired rotation of the sensor in the depression. The depression may be embodied as a drilled hole.

In order to produce a premountable physical unit comprised of the sensor, cable, and the spring component are then accommodated in an intermediate sleeve, which is preferably made of plastic. A radially directed flange enables simple axial mounting of this unit in the wheel carrier. To be able to exchange the sensor easily at a later time without disassembling the wheel bearing, the outward end or base of the sleeve is comprised of a separate cap which is mounted on the intermediate sleeve.

Other features and advantages of the present invention will become apparent from the following description of the invention which refers to the accompanying drawings.

DETAILED DESCRIPTION OF THE INVENTION

Figure 1:
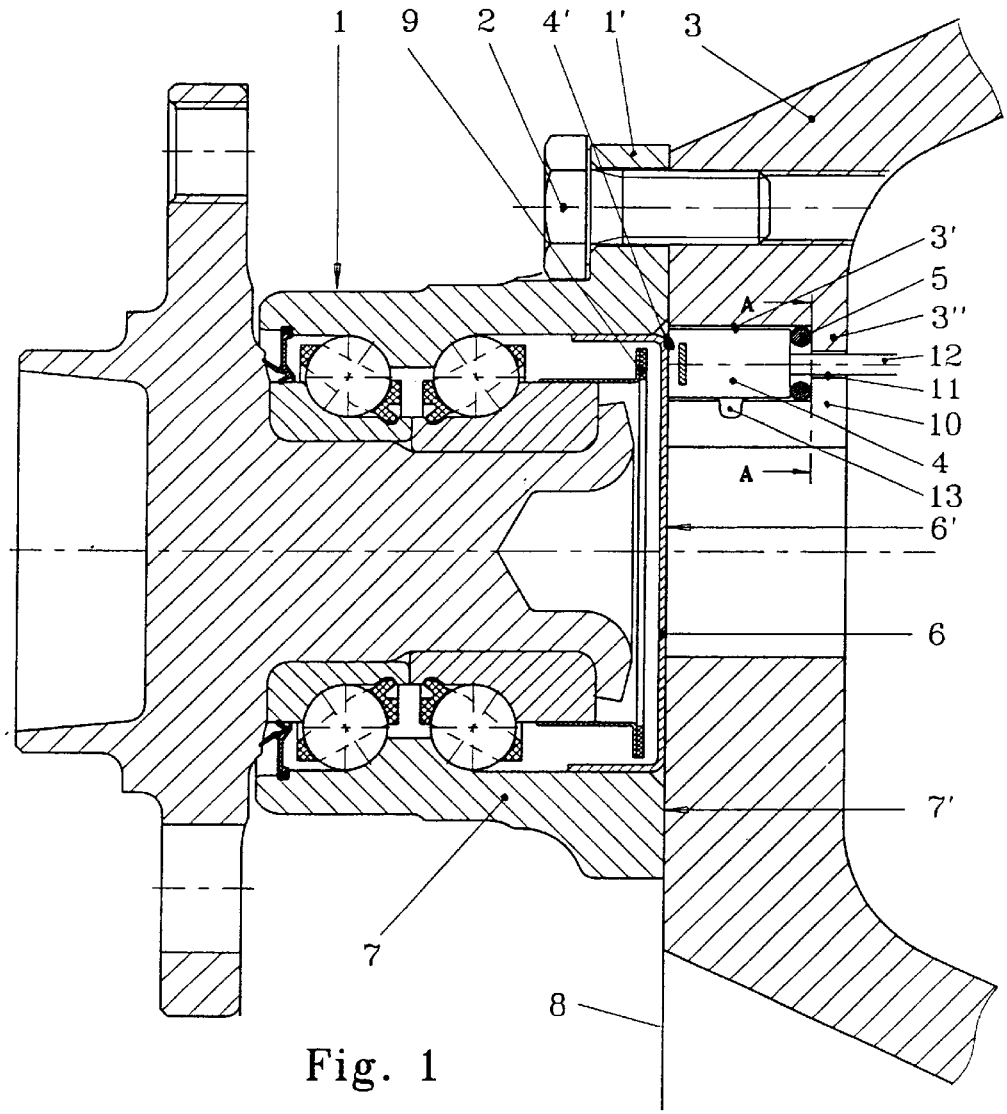
FIG. 1 shows a longitudinal section through a wheel bearing with the sensor mount of the invention.

In FIG. 1, a vehicle wheel bearing comprises a roller bearing 1 with a mounting flange 1'. The flange 1' is mounted on the wheel carrier 3 by screws 2. An axially directed hole 3' drilled in the wheel carrier receives a sensor 4. The sensor is supported above the base 3" of the drilled hole 3' by a compression spring 5 in the depression, shown here as an elastic resilient O-ring. The spring presses the sensor 4 automatically out of the hole until the sensor bears against a cover cap 6 on the axial end of the bearing. The cover cap 6 is arranged in the drilled hole of the outer ring 7 of the bearing 1. The cap 6 is axially secured such that its bottom outward face 6' lies in a plane 8 which is determined by the end face 7' of the outer ring 7. That face is usually very precisely defined during the manufacture of the bearing. As a result, the position of the sensor 4 is also precisely maintained because its end face 4' bears against the bottom face 6' of the cap. This ensures that the distance between the sensor end face 4' and the pulse transmitter ring 9, which is precisely mounted on the inner ring of the roller bearing 1, is complied with exactly, and without need for costly mounting and adjustment operations. Thus, a double function is performed by the cover cap 6. On the one hand, it seals the interior of the bearing in a simple way. On the other hand, the cap acts as a precise bearing face for the sensor 4.

Figure 2:
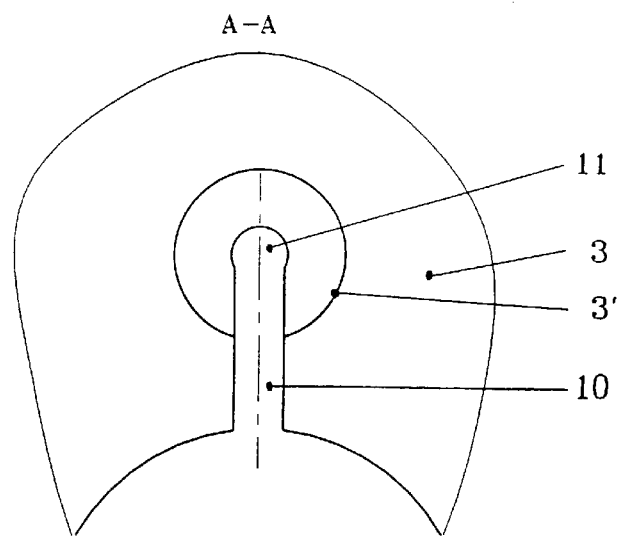
FIG. 2 shows a partial cross section at A—A in FIG. 1.

Assembly of the sensor 4 can also be simplified by providing a slit 10 in the wheel carrier 3, as shown in FIG. 2. The wheel carrier has a central bore, and the slit extends radially between the depression for the sensor 4 and the central bore of the carrier 3. As a result, the cable 12 which is later arranged in the small drilled hole 11 can easily be inserted radially from the inside. The slit 10 can also provide anti-rotation protection of the sensor 4 if a radially directed projection 13 is provided on the sensor, when the projection 13 is allowed to protrude into the slit 10.

Figure 3:
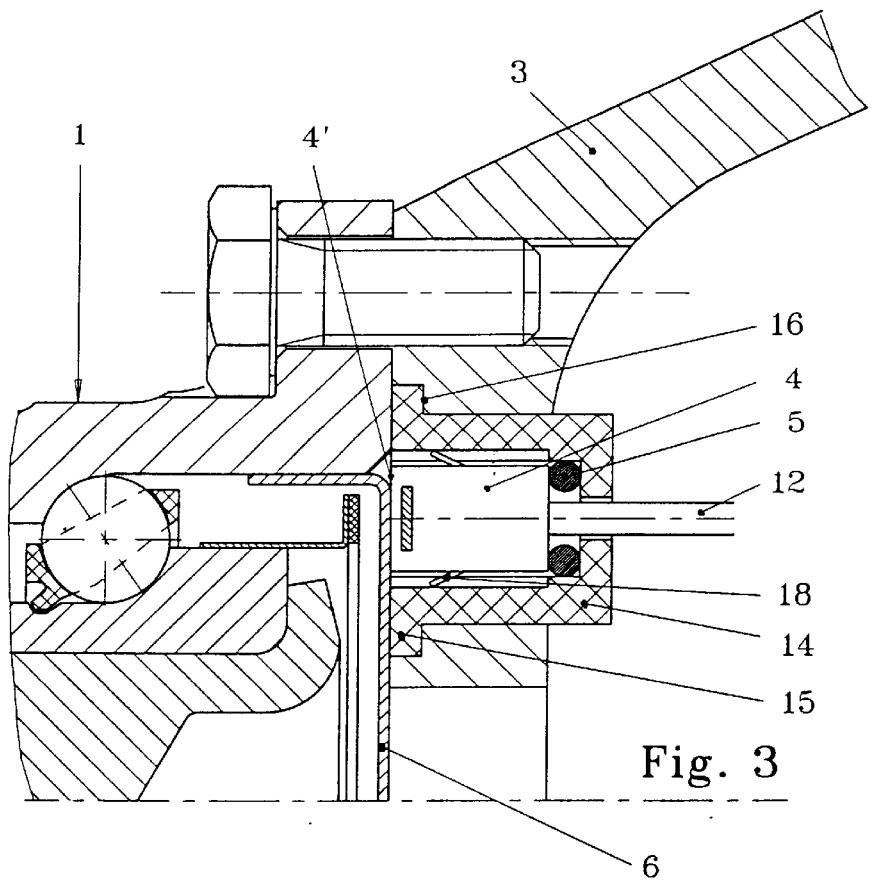
FIG. 3 is an enlarged, partial view of a variant of FIG. 1.

In the embodiment of FIG. 3, the sensor 4 is not mounted directly in the wheel carrier 3. Instead, it is located in an intermediate sleeve 14 made of plastic. On the side of the end face 4' of the sensor 4, the sleeve has a radially directed mounting flange 15 which protrudes into corresponding cut-outs 16 in the wheel carrier 3 to provide axial securement of the sensor. It is here sufficient to simply bring the components together without costly positioning and mounting measures. The spring 5 presses the sensor against the cover cap 6 automatically.

Figure 4:
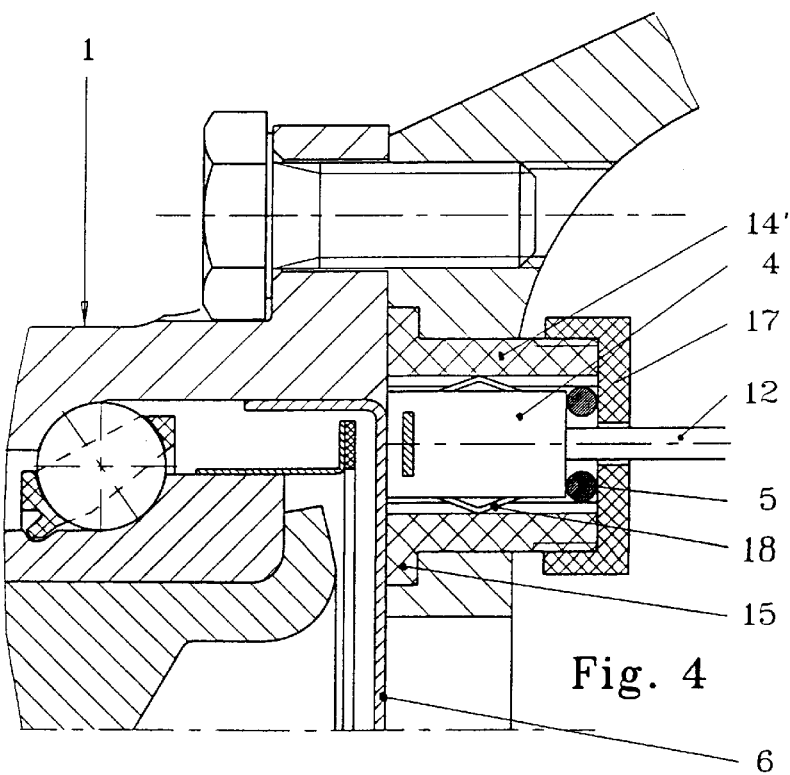
FIG. 4 is the same type of view showing a development of FIG. 3.

The variant in FIG. 4 shows a separate cap 17, which is in addition to the intermediate sleeve 14' on the base of that variant. The screw on cap 17 permits the sensor 4 to be replaced easily and quickly during repair operations, because the cap 17 only has to be unscrewed in order to be able to remove the sensor 4 along with the cable 12.

In FIG. 3 and in FIG. 4 there are elastic projections 18 on the sensor 4 which bear, with an overdimension, against the drilled hole face of the intermediate sleeve 14 and 14', respectively, for holding the sensor in the wheel carrier 3 even before the roller bearing 1 is assembled.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing with rotation speed sensing, comprising:
    a wheel bearing including first and second rings and rolling elements between the rings enabling relative rotation of the rings;
    a wheel support on the first ring, a wheel carrier to which the second ring is attached, wherein the wheel carrier is located at one axial end of the bearing;
    a pulse transmitter supported on the first ring of the bearing and located toward the wheel carrier;
    a depression defined in the wheel carrier and opening out toward and opposed to the pulse transmitter;
    a sensor for sensing the rotative passage of the pulse transmitter past the sensor, the sensor including an end face facing toward the pulse transmitter;
    the second ring including a bearing component thereon against which the sensor end face may bear;
    a spring urging the sensor and the end face thereof against the bearing component, whereby a selected spacing in between the sensor and the pulse transmitter may be maintained during relative rotation of the rings.

2. The wheel bearing of claim 1, wherein the sensor is disposed in the depression and the spring acting on the sensor is located in the depression in the wheel carrier.

3. The wheel bearing of claim 1, wherein the first ring of the bearing is the inner ring and wherein the second ring of the bearing is the outer ring.

4. The wheel bearing of claim 1, wherein the bearing component on the second ring comprises a generally pot shaped cover cap mounted on the second ring at the lateral side thereof and the sensor being urged by the spring against the cover cap.

5. The wheel bearing of claim 4, wherein the cap is so shaped and is so located as to have an outward face that is located in a plane that corresponds to the lateral end face of the respective second ring.

6. The wheel bearing of claim 5, wherein the first ring of the bearing is the inner ring and the second ring of the bearing is the outer ring.

7. The wheel bearing of claim 1, further comprising the depression having a base and a hole in the base through which electric cables connected with the sensor may pass.

8. The wheel bearing of claim 1, further comprising the wheel carrier having an open bore radial interior; and
    a radially directed open slit in the wheel carrier between the depression and the radial interior of the wheel carrier.

9. The wheel bearing of claim 8, further comprising a radially directed projection on the sensor which protrudes into the slit.

10. The wheel bearing of claim 1, further comprising an intermediate sleeve located in the depression; the sensor being located within the sleeve; a connection on the sleeve between the sleeve and the second ring on the side of the sleeve toward the sensor for mounting the sleeve in the wheel carrier and at the second ring.

11. The wheel bearing of claim 10, wherein the sleeve is comprised of plastic.

12. The wheel bearing of claim 11, wherein the sleeve includes an end away from the pulse transmitter and comprises a separate cap over that end.

13. The wheel bearing of claim 10, further comprising elastic projections on the sensor which bear with overdimension on the sleeve for holding the sensor in the sleeve.

14. The wheel bearing of claim 1 further comprising elastic projections on the sensor and protruding with overdimension against the interior of the depression for holding the sensor in the recess.

* * * * *